3,562,118
METAL PLATED PLASTICS AND PROCESS
THEREFOR
Frederick L. Baier, South Plainfield, and Fred H. Ancker,
Bound Brook, N.J., assignors to Union Carbide Corporation, a corporation of New York
No Drawing. Filed Mar. 24, 1966, Ser. No. 536,986
Int. Cl. C23b 5/64; B44d 1/40
U.S. Cl. 204—30                                       3 Claims The invention relates to metal plated plastics and to a process therefor. More specifically, it relates to metal plated polypropylene/elastomer compositions exhibiting high metal-to-polymer adhesion and to a process for the preparation thereof.

Metallic coatings on plastics have been used for many years for electrical and for decorative purposes (e.g. printed circuit boards, Christmas decorations). Recently, there has been incrtasing commercial interest in functional uses, i.e., applications where metal coated plastic parts can replace current all-metal parts. Aside from being more economical to make, metal coated plastic parts are superior to all-metal parts in important respects. For instance, chrome-plated plastic is more weather resistant than chrome-plated metal since the base material inherently is noncorrosive; also, a considerable weight can often be saved while the metallic appearance and feel is retained.

However, in order to realize these advantages, it is necessary to have a high level of adhesion between the metal coating and the plastic surface. If this is not the case, the metal coating may blister or peel from the base plastic either during variations in temperature—due to the difference in thermal coefficient of expansion between metal and plastic or during small strains—due to the difference in elastic modulus (stiffness). It has been empirically established that a minimum peel strength of about 5 lbs./in. is required to prevent this type of failure in most applications of metal coated plastic parts.

The basic problem which arises when various metal deposition techniques are applied to most currently available plastic substrates is that low metal-to-polymer adhesion values are generally obtained. In fact, to date only one plastic resin—ABS (acrylonitrile/butadiene/styrene) —is generally accepted as a satisfactory substrate capable of meeting the practical application requirement of 5 lbs./in. metal-to-plastic peel strength on a reasonably consistent basis.

Isotactic polypropylene has some important advantages over ABS as a plating substrate; e.g., lower cost, lower density, and generally better molding characteristics resulting in superior surface properties of molded parts. Unfortunately, it has proven especially difficult to develop satisfactory metal adhesion to this polymer.

It is well known that crystalline, stereoregular polyolefins chemically are very inert in the solid state. This is true not only for high density polyethylene, but even for isotactic polypropylene which otherwise might be expected to be fairly reactive due to the presence of tertiary hydrogen atoms in the polymer backbone. This lack of chemical reactivity due to crystallinity is a very general phenomenon which is based on the fact that the free energy of a substance in the crystalline state necessarily is lower than in the amorphous state. Thus, when a substance reacts chemically with another material, the activation energy usually becomes higher and the reaction rate correspondingly lower if the substance is in the more stable crystalline state. In case of diffusion-controlled reactions, the chemical reactivity is further reduced due to the fact that diffusion rates usually are markedly lower when a substance is in a crystalline rather than an amorphous state. This has been clearly demonstrated experimentally in the case of high polymers which show the lower chemical reactivity when in their most perfect crystalline form (i.e. as single crystals), te highest reactivity when completely amorphous and intermediate reactivities roughly proportional to the amorphous resin fraction when the polymer is partially crystalline.

It is, therefore, apparent that the chemical reactivity of polypropylene and thereby the metal-to-polymer adhesion can be increased by methods which reduce the crystallinity of the polymer such as quenching (i.e. rapid super cooling) or copolymerization which interrupts the stereoregular chain configuration necessary for crystallization. However, when such methods are attempted with polypropylene it is found that in order to increase the chemical reactivity to a satisfactory level, it is necessary to reduce the crystallinity to a level where the mechanical and thermal properties (modulus, tensile strength, heat distortion) are so low as to render the polymer practically useless.

Accordingly, it is an object of the present invention to provide propylene polymer substrates for metal plating capable of developing metal-to-plastic peel strengths in excess of 5 lbs./in.

It is another object to develop propylene polymer substrates which have a desirable combination of thermal properties (heat distortion temperature) and mechanical properties (impact strength).

These and other objects are achieved by the present invention which provides a process for imparting adhesion of metal coatings to propylene polymer substrates in excess of about 5 pounds per inch which comprises incorporating at least one hydrocarbon elastomer containing tertiary aliphatic or allylic hydrogens in a repeating unit thereof into a propylene polymer containing at least about 90 percent propylene and having an annealed crystallinity of at least about 40 percent, said elastomer being incorporated into said propylene polymer in amounts of from about 5 to 25 percent by weight commensurate with the degree of crystallinity of the propylene polymer, oxidizing the surface of the resulting propylene polymer mixture, and thereafter metal plating the oxidized propylene polymer mixture.

The crystallinity of a given polymer is strongly influenced by the detailed heat history of the particular test sample. Thus, for the purpose of this invention, crystallinity is defined as annealed crystallinity, i.e., the test sample must be heated between metal plates to a temperature of about 10° above its melting point, held at this temperature for 1 hour and then allowed to cool slowly to room temperature at a constant rate of 5° C. per hour. A regulator suitable for lowering the temperature of an annealing oven at a constant rate is described by Birks and Rudin in ASTM Bulletin No. 242, pages 63–67 (December 1959).

Also for the purpose of this invention, crystallinity of the propylene polymer, i.e., either homopolymer or copolymer, is defined as the weight percentage of crystallized isotactic polypropylene as determined by standard X-ray methods, or—if other methods such as infrared or density can be used—then the calibration should be based on X-ray. The preferred propylene polymers of this invention are thus either propylene homopolymers or copolymers containing at least 90% by weight of propylene and having an annealed X-ray crystallinity of at least 40%. Exemplary of such propylene polymers are isotactic polypropylene and impact copolymers of propylene and olefinic comonomers such as ethylene, butene and the like.

The hydrocarbon elastomers of the present invention are olefin or diene homo- or co-polymers which contain tertiary aliphatic or allylic hydrogen in at least one of their repeating units such as substantially atactic ethylene/propylene copolymers; polyisoprene; polybutadiene; styrene/isoprene and styrene/butadiene copolymers, and the like. In contrast, hydrocarbon elastomers which do not contain tertiary aliphatic or allylic hydrogens such as polyisobutylene as well as elastomers containing more than token amounts ($\geqslant 5\%$) of highly polar functionally substituted monomers such as chloroprene, cyanoprene, acrylonitrile, and the like do not form satisfatcory (reactive and compatible) polymeric mixtures or blends with the above described propylene polymers.

The admixture of the above hydrocarbon elastomers to propylene polymers results in polymeric mixtures or blends which have adequate chemical reactivity to enable excellent adhesion to metal coatings. Furthermore, these mixtures suffer much less reduction in annealed crystallinity and associated physical properties than is calculated based on the addition of the amorphous resin. Evidently, addition of the elastomers permits a larger fraction of the isotactic polypropylene to crystallize resulting in a reduced loss in desirable properties.

The amount of elastomeric additive required to attain a sufficient level of chemical reactivity is generally from about 5% to about 25% based on the total polymeric composition, the amount depending on the crystallinity of the base polymer. Thus, the high-impact propylene copolymers usually have somewhat lower crystallinities and therefore require less additive than do the more highly isotactic propylene homopolymers. Nevertheless, at least about 5% elastomer additive is required even with high impact propylene copolymers to attain a satisfactory level of adhesion, i.e., at least about 5 pounds per inch peel strength; yet, not more than about 25% is required even with the most highly crystalline homopolymers (i.e., $\geqslant 80\%$ crystallinity).

In general, the substrates formed from the propylene polymer mixtures of the present invention can be plated by a process wherein said substrate is first "oxidized" by treatment with a strong oxidizing solution, e.g., chromic acid/sulfuric acid, and then "sensitized" in a solution of a reducing agent, e.g., stannous chloride. The substrate is thereafter "activated" by immersion in a dilute solution of a noble metal salt, e.g., palladium chloride, and then transferred to a so-called "electroless plating" bath wherein the substrate receives a sufficiently conductive metal coating to permit subsequent electroplating by the conventional methods used for standard metal parts. Electroless plating solutions are meta-stable solutions of a metal salt, e.g., copper, nickel and the like, and a reducing agent, e.g., formaldehyde, hydrophosphite, sodium borohydride, and the like, in which reduction of the metal ion is inhibited by complexing agents such as ammonia, hydroxycarboxylic acids, and the like. The primary purposes of the pre-treatments are to improve the metal-to-polymer adhesion and to assure that the deposition of metal from the electroless plating solution occurs on the surface of the plastic substrate in preference to the walls of the plating bath.

Oxidizing solutions found suitable for use in the present invention are aqueous solutions of chromic acid in inorganic acids or aqueous solutions of chromic acid, both being at least about 85% saturated with respect to chromic acid at the particular use temperature of the oxidizing bath. For example, an oxidizing bath containing 29 parts chromium trioxide, 29 parts concentrated sulfuric acid and 42 parts of water has been found useful. Other oxidizing solutions and techniques, however, can similarly be employed such as flame treatment, corona discharge, glow discharge, ozonation, or exposure to actinic or high energy radiation and the like in a manner and duration sufficient to oxidize the surface of the substrates formed from the propylene polymer mixtures of the present invention.

A conductive metal coating can be deposited on the oxidized polymeric mixture thereby permitting subsequent conventional electroplating techniques to be employed to obtain an electroplated polymeric substrate exhibiting minimum peel strengths of at least about 5.0 pounds per inch. The conductive metal coating can be deposited by immersing the oxidized polymeric substrate in a solution of a reducing agent such as stannous chloride to sensitize said substrate. The sensitized substrate can then be immersed in a solution containing a salt of a noble metal such as platinum, palladium, silver and gold and preferably in the form of a halide such as palladium chloride to activate said substrate. In lieu of the sensitizing and activating baths, other means can be employed to deposit an initial metal film in preparation for subsequent electroless metal deposition. For example, such films can be deposited by spray gun systems, gas plating, cathode sputtering, vacuum metallizing, decomposition of metal carbonyls and the like. Thereafter, the polymeric substrate can be immersed in an electroless plating solution such as those composed of a copper salt, a complexing agent to keep the copper in solution and a reducing agent to deposit a conductive metal film on said substrate. Finally, the resulting polymeric substrate having a conductive metallic film thereon can be electroplated by conventional techniques which generally comprises electrodepositing ductile copper, bright nickel and chromium to obtain an electroplated polymeric substrate exhibiting minimum peel strengths of at least about 5.0 pounds per inch.

The following examples are merely illustrative of the present invention and are not to be construed as imposing any limitation on the scope thereof. All percentages and parts are by weight unless otherwise stated.

EXAMPLES 1–4

A commercial grade of polypropylene homopolymer having a melt flow (230° C./44 p.s.i.) of 4 decigrams per minute (ASTM D 1238) and an annealed crystallinity of 75% is heated and sheared on a steam-heated two roll mill using 160 p.s.i. steam pressure on the rolls. After the molten resin bands on the roll, an amorphous ethylene/propylene copolymer rubber containing 42 mole percent propylene and having a Mooney viscosity of 42 (M 8 at 212° F.) is added in the amounts indicated below and is mixed with the molten polypropylene until a uniform blend is obtained. The blend is sheeted off the mill and allowed to cool to room temperature. The sheet is then heated in a hydraulic press to a temperature of 190° C. between chrome-plated steel plates under low pressure for 5 minutes, and the pressure is then increased to 500 p.s.i. on the sheet; while still under pressure the press platens are slowly cooled to room temperature.

The following method is used to deposit a metal coating on the resulting 125 mil compression molded plaques. After rinsing in an alkaline detergent solution to clean the substrates, the plaques are surface-oxidized in a chromic acid/sulfuric acid bath containing 29% $CrO_3$, 29% $H_2SO_4$ and 42% $H_2O$. The bath temperature is 80° C. and the immersion time is 15 minutes. The plaques are then rinsed carefully in water, "sensitized" by a brief immersion in a dilute acidic solution of stannous chloride (Enthone Sensitizer 432), again rinsed well in water and then "activated" by a brief immersion in a dilute acidic solution of palladium chloride (Enthone Activator 480).

The plaques are again rinsed well in water and then immersed in an electroless copper solution (Enthone "Enplate" Cu 400 A+B) for ten minutes at room temperature. The plaques now have a sufficiently conductive deposit of copper to permit electroplating. Finally, about 2½–3 mils of ductile copper are deposited by electroplating using a bright acid copper bath (Udylite "Ubac" #1), a bath temperature of 27° C. and a current density of 60 amps per square foot.

The metal-to-plastic adhesion is determined by a peel strength test as follows: A one inch strip is scored through the copper coating and one end of the copper strip is lifted away from the plastic using a soldering gun. A force is then applied to the free end of the one inch copper strip perpendicularly to the surface of the plaque and the force required to release the copper from the plastic is measured. The results are tabulated below:

| Example | EPR-rubber content percent | Metal/plastic peel strength, lbs./inches |
|---|---|---|
| Control | 0 | 0.6 |
| 1 | 5 | 2.2 |
| 2 | 10 | 4.7 |
| 3 | 15 | 12.6 |
| 4 | 20 | 18.7 |

It is seen that addition of the amorphous ethylene/propylene rubber markedly improves the metal-to-polymer adhesion. Moreover, due to the high degree of crystallinity, i.e., 75%, of the polypropylene homopolymer, a commensurately high percentage of elastomer is required to impart metal-to-polymer adhesion thereto in excess of 5 pounds per inch.

EXAMPLES 5–6

Using the polypropylene homopolymer described in the previous examples, mixtures are prepared containing respectively 15% of an emulsion polymerized polybutadiene having a Mooney viscosity of 41 (ML 4 at 212° F.); a styrene/butadiene rubber having a styrene content of 23.5% and a Mooney viscosity of 50 (ML 4 at 212° F.); and a polyisobutylene homopolymer having an intrinsic viscosity of 2.3 deciliters per gram (diisobutylene solution at 20° C.) Electroplated samples are prepared and tested in the same manner as described in the previous examples with the following results:

| Example | Elastomer additive, 15% | Peel strength, lbs./inches |
|---|---|---|
| Control | None | 0.4 |
| Do | Polyisobutylene | 0.4 |
| 5 | Polybutadiene | 17.9 |
| 6 | Butadiene/styrene copolymer | 15.9 |

It is seen that addition of a diene homopolymer or copolymer rubber has a beneficial effect on adhesion similar to that of an ethylene/propylene copolymer rubber. It is also seen that an elastomer which does not contain reactive hydrogens (tertiary aliphatic or allylic) namely, polyisobutylene, offers no improvement in metal-to-polymer adhesion.

EXAMPLES 7–10

A propylene polymer having a melt flow (230° C./44 p.s.i.) of 5 decigrams per minute (ASTM D 1238) and an annealed crystallinity of 58% is heated and sheared in the manner described in the previous examples.

An amorphous ethylene/propylene copolymer rubber containing 42 mole percent propylene and having a Mooney viscosity of 42 (M 8 at 212° F.) is added in the amounts indicated below and is mixed with the molten polypropylene until a uniform blend is obtained. Electroplated samples are prepared and tested in the same manner described in the previous examples with the following results:

| Example | EPR-rubber content percent | Metal/plastic peel strength, lbs./inches |
|---|---|---|
| Control | 0 | 0.5 |
| 7 | 5 | 3.8 |
| 8 | 10 | 11.3 |
| 9 | 15 | 15.4 |
| 10 | 20 | 20.6 |

It is seen that adhesion of the amorphous ethylene/propylene rubber markedly improves the metal-polymer adhesion. A comparison of the above data with that obtained in Examples 1 to 4 above demonstrates that when a propylene polymer having a lower degree of crystallinity, i.e., 58% as compared to 75%, is employed, a commensurately lower percentage of elastomer is required to impart metal-to-polymer adhesion thereto in excess of 5 pounds per inch.

The metal plated propylene polymer mixtures or blends of the present invention are useful in the appliance fields as knobs and/or handles on radios, televisions, refrigerators, housing, trim and/or components of refrigerators, vacuum cleaners, air conditioners, office machines, radio grills and cases and to replace zinc castings. They are also useful in the automotive fields as radio knobs and push buttons, instrument cluster housings, garnish moldings, window cranks and handles, and control levers. They are further useful in the hardware field as knobs, electrical outlet face-plates, toys, housings, and the like. Also, they are useful for more demanding applications of printed electrical circuit boards, especially where direct soldering to metal panels are required.

What is claimed is:

1. Process for imparting adhesion of metal coatings to propylene polymer substrates in excess of about 5 pounds per inch which comprises incorporating at least one hydrocarbon elastomer containing tertiary aliphatic or allylic hydrogens in a repeating unit thereof into a propylene polymer containing at least about 90 percent propylene and having an annealed crystallinity of at least about 40 percent, said elastomer being incorporated into said propylene polymer in amounts of from about 5 to 25 percent by weight commensurate with the degree of crystallinity of the propylene polymer, oxidizing the surface of the resulting propylene polymer mixture, and thereafter metal plating the oxidized propylene polymer mixture.

2. Process as defined in claim 1 wherein the propylene polymer substrate is oxidized upon immersing said substrate in an oxidizing solution selected from the group consisting of aqueous solutions of chromic acid in inorganic acids and aqueous solutions of chromic acid, said solutions being at least about 85 percent saturated with respect to chromic acid at the use temperature of the oxidizing solution.

3. Process as defined in claim 1 wherein the oxidized propylene polymer substrate is metal plated by immersing the oxidized substrate in a solution of a reducing agent to sensitize said substrate, immersing the sensitized substrate in a solution of a noble metal salt to activate said substrate, immersing said activated substrate in an electroless metal plating solution to deposit a conductive metal film thereon, and thereafter electroplating the resulting propylene polymer substrate.

References Cited

UNITED STATES PATENTS

| | | | |
|---|---|---|---|
| 3,201,271 | 8/1965 | Simmons, Jr. et al. | 117—47R |
| 3,305,460 | 2/1967 | Lacy | 204—20 |
| 3,286,009 | 11/1966 | Yumoto et al. | 264—129 |
| 3,142,581 | 7/1964 | Le Land | 117—47 |
| 3,314,813 | 4/1967 | Maxion | 117—12 |
| 3,317,330 | 5/1967 | Livingston et al. | 106—287 |

OTHER REFERENCES

Iind et al., Chemical Abstracts; vol. 64, 1966–5272(h), Blending of Polybutadiene and Atactic Polypropylene.

Pritchard, Chemical Abstracts; vol. 65, 1966 2451(c), Impact-Resistant Polypropylene Compositions.

JOHN H. MACK, Primary Examiner

W. B. VAN SISE, Assistant Examiner

U.S. Cl. X.R.

117—47; 156—2; 204—20